(12) United States Patent
Bodin

(10) Patent No.: US 6,607,203 B2
(45) Date of Patent: Aug. 19, 2003

(54) STEERING KNUCKLE

(75) Inventor: Jan-Olof Bodin, Alingsås (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/064,225

(22) Filed: Jun. 21, 2002

(65) Prior Publication Data

US 2003/0011160 A1 Jan. 16, 2003

Related U.S. Application Data

(63) Continuation of application No. PCT/SE00/02601, filed on Dec. 20, 2000.

(30) Foreign Application Priority Data

Dec. 22, 1999 (SE) ............................................... 9904731

(51) Int. Cl.$^7$ ............................................... B62D 7/18
(52) U.S. Cl. ........................ 280/93.512; 280/124.125
(58) Field of Search ..................... 280/93.512, 124.125, 280/137.503, 137.506; 301/132

(56) References Cited

U.S. PATENT DOCUMENTS

| 4,225,260 A | * | 9/1980 | Gaines | 403/114 |
|---|---|---|---|---|
| 4,798,394 A | * | 1/1989 | Pollock et al. | 280/93.512 |
| 5,316,332 A | * | 5/1994 | Ingalls | 280/86.756 |
| 5,340,137 A | | 8/1994 | Carraro et al. | 280/96.1 |
| 5,413,365 A | * | 5/1995 | Bodin et al. | 280/93.512 |
| 5,992,863 A | * | 11/1999 | Forbes-Robinson et al. | 280/86.751 |
| 6,029,986 A | * | 2/2000 | Bodin et al. | 280/93.512 |
| 6,071,032 A | * | 6/2000 | Link | 403/158 |
| 6,186,525 B1 | * | 2/2001 | Bodin | 280/93.512 |
| 6,217,046 B1 | * | 4/2001 | Bodin et al. | 280/93.512 |
| 6,357,956 B1 | * | 3/2002 | Zebolsky et al. | 403/134 |
| 6,499,752 B1 | * | 12/2002 | Davis | 280/93.512 |

FOREIGN PATENT DOCUMENTS

| DE | 2161598 A | 6/1973 |
|---|---|---|
| FR | 2576860 A1 | 8/1986 |

* cited by examiner

*Primary Examiner*—Paul N. Dickson
*Assistant Examiner*—Toan C To
(74) *Attorney, Agent, or Firm*—Howrey Simon Arnold & White LLP

(57) ABSTRACT

Spindle arrangement for a non-driven, steerable vehicle wheel of a motor vehicle including a spindle unit (10) with bores (11) located at an axial distance from one another and aligned axially with one another for rotatable mounting of the spindle unit (10) relative to a kingpin (4; 4') accommodated via a central portion (5) in a through-bore (3) in a front axle-beam (2). A stub axle unit (18) is connected to the spindle unit (10) and on which a wheel hub (19) is mounted. Bearing means (8, 9) for the rotatable mounting of the spindle unit (10) are arranged at a first and second end (6, 7; 6', 7) of the kingpin (4; 4'). When the bearing means (8) located at the first end (6; 6') of the kingpin (4; 4') is a spherical sliding bearing (8), that bearing (8) takes up only radial forces in relation to the center axis (12) of the kingpin (4; 4').

12 Claims, 3 Drawing Sheets

STEERING KNUCKLE

CROSS REFERENCE TO RELATED APPLICATIONS

The present application is a continuation of International Application No. PCT/SE00/02601, filed Dec. 20, 2000 and published in English pursuant to PCT Article 21(2), now abandoned, and which claims priority to Swedish Application No. 9904731-8 filed Dec. 22, 1999. The disclosures of said applications are expressly incorporated herein by reference in their entireties.

BACKGROUND OF INVENTION

1. Technical Field

The present invention relates to a spindle arrangement for a non-driven, steerable vehicle wheel for motor vehicles, comprising a spindle unit with bores, located at an axial distance from one another and aligned axially with one another, for rotatable mounting of the spindle unit relative to a kingpin accommodated via a central portion in a through-bore in a front axle-beam, a stub axle unit which is connected to the spindle unit and on which a wheel hub is mounted, and, arranged at a first and second end of the kingpin, bearing means for the rotatable mounting of the spindle unit.

2. Background of the Invention

A spindle arrangement is used to make it possible to steer a motor vehicle, such as a lorry. The spindle arrangement is coupled to a vehicle wheel which is made steerable by means of the spindle arrangement.

A common type of spindle arrangement for lorries has a spindle unit mounted in a conical roller bearing at the upper end of the kingpin and a radial sliding bearing at its lower end. The upper bearing takes up both axial and radial forces, while the lower takes up only radial forces. In such a spindle mounting, the axial force on the upper bearing is load-dependent, for which reason the axial loading on the bearing varies with the total weight on the vehicle. Under particular driving conditions, such as during cornering with a great load, a torque arises in the spindle arrangement, which is taken up by the radial sliding bearing. The torque taken up by the radial sliding bearing can result in a certain play occurring between the bearing surfaces of the radial sliding bearing.

SUMMARY OF INVENTION

One object of the present invention is to produce a spindle arrangement which is non-sensitive to torque forces acting on the spindle arrangement.

Another object of the invention is to produce a spindle arrangement which has a long useful life.

This is achieved by means of a spindle arrangement of the type indicated above in which the bearing means at the first end of the kingpin is a spherical sliding bearing and in which the kingpin is oriented in such a manner in relation to the spindle unit that the spherical sliding bearing takes up only radial forces in relation to the center axis of the kingpin.

The spherical sliding bearing allows a relative displacement between the bearing surfaces of the sliding bearing in a direction of rotation about an axis transverse to the center axis of the kingpin. This displacement arises from the torque which acts on the spindle arrangement. By virtue of the spherical sliding bearing, the point loads which would otherwise arise in a radial sliding bearing are avoided. The forces which arise in the spherical sliding bearing are evened out over a large area between the bearing surfaces of the spherical sliding bearing. Low wear of the spherical sliding bearing is thus obtained, which results in a long useful life of the spindle arrangement.

BRIEF DESCRIPTION OF DRAWINGS

The invention will be described below by means of an exemplary embodiment shown in the appended figures, in which.

DETAILED DESCRIPTION

Figure 1:
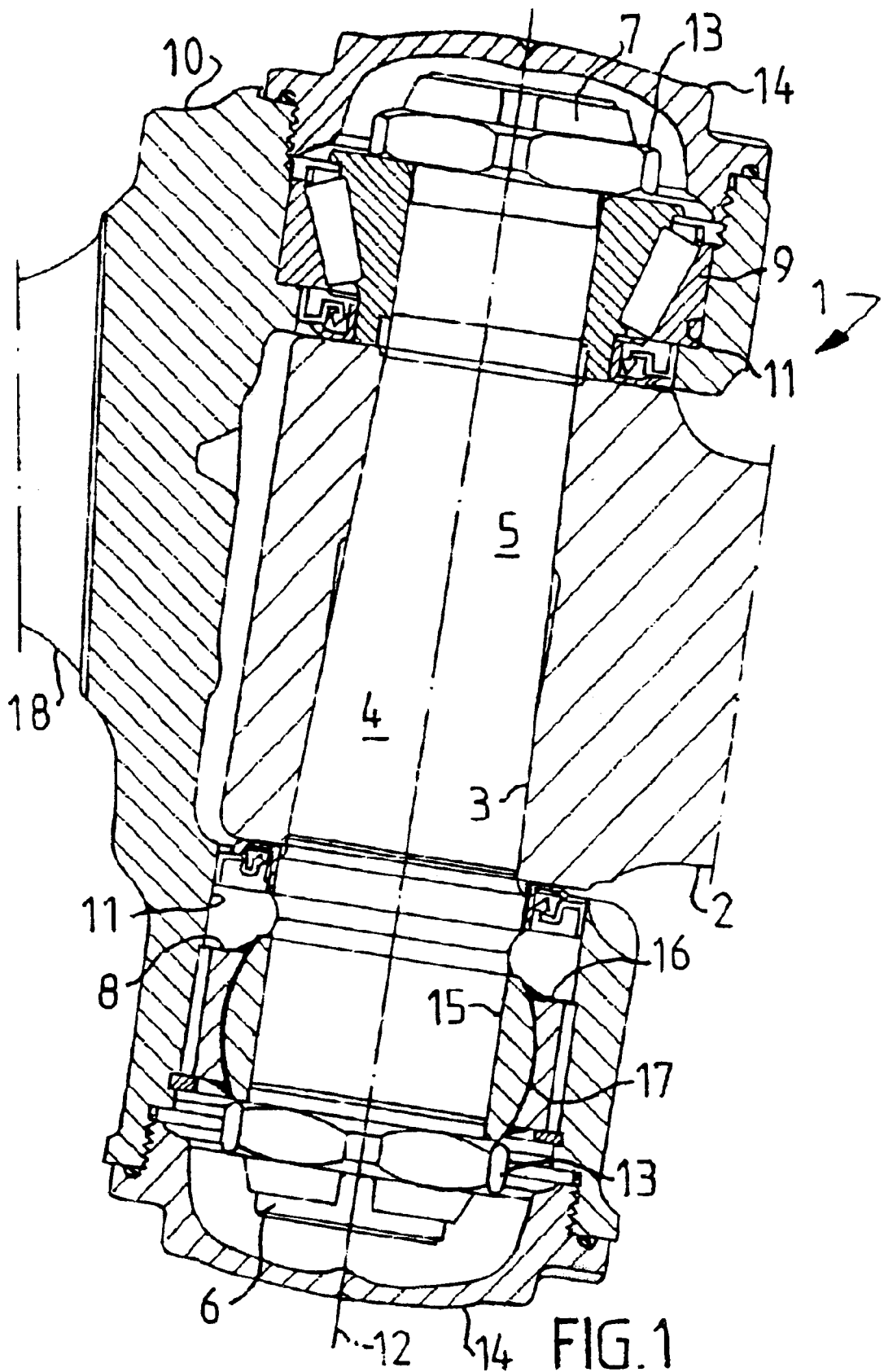
FIG. 1 shows in a partial cross-sectional view a first exemplary embodiment of a spindle arrangement according to the present invention.

FIG. 1 shows a spindle arrangement 1 according to a first embodiment of the invention. The spindle arrangement 1 includes a front axle-beam 2 for a vehicle, and which is provided with a through-bore 3. A kingpin 4 is accommodated in the through-bore 3. The kingpin 4 has a central portion 5 and a first end 6 and a second end 7. Bearing assemblies or bearing means 8 and 9, which rotatably support a spindle unit 10 in relation to the front axle-beam 2, are arranged on the first 6 and second ends 7. The central portion 5 of the kingpin 4 may be conical or frusto-conical, as shown in FIG. 1, and interact with the through-bore 3, which is also conical or frusto-conical in nature. The central portion 5 and the through-bore 3 can have a different shape, however; for example, cylindrical.

The spindle unit 10 is provided with bores 11 which are located at an axial distance along the kingpin 4 from one another and are axially aligned, one with the other when the ends 6 and 7 of the kingpin 4 are inserted and supported by means of the bearings 8 and 9. The bearing means 8 at the first end consists of a spherical sliding bearing 8. According to the first exemplary embodiment, the first end 6 of the kingpin 4 is constituted by a lower end of the kingpin 4 in relation to the including vehicle. The bearing means 9 on the second and upper end 7 consists of a conical roller bearing 9. The conical roller bearing 9 is designed to take up axial forces in relation to the center axis 12 of the kingpin 4. The kingpin 4 is fixed axially to the conical roller bearing 9 by a castle nut 13 screwed onto the second end 7 of the kingpin 4, and is therefore suspended in the roller bearing 9. The conical roller bearing 9, the castle nut 13 and the second kingpin end 7 are covered by a cover 14.

The spherical sliding bearing 8 is fixed, via a convex bearing portion 15, at the first end 6 by means of a castle nut 13 screwed onto the first end 6. A concave bearing portion 16 interacting with the convex bearing portion 15 is fixed in the bore 11 of the spindle unit 10. The convex and concave bearing portions 15, 16 of the spherical sliding bearing 8 have opposed bearing surfaces 17 which are movable relative to one another in a direction of rotation about the center axis 12 of the kingpin 4 and in a direction of rotation about an axis transverse to the center axis 12 of the kingpin 4. The spherical sliding bearing 8 results in the kingpin 4 being allowed to be inclined in relation to the bore 11 of the spindle unit 10 without point loads and edge pressings occurring in the sliding bearing 8. The portions 15, 16 of the sliding bearing 8 will therefore be displaced relative to one another, so that a uniform surface pressure at the bearing surfaces 17 is obtained. The spherical sliding bearing 8, the castle nut 13 and the first kingpin end 6 are also covered by a cover 14.

Figure 2:
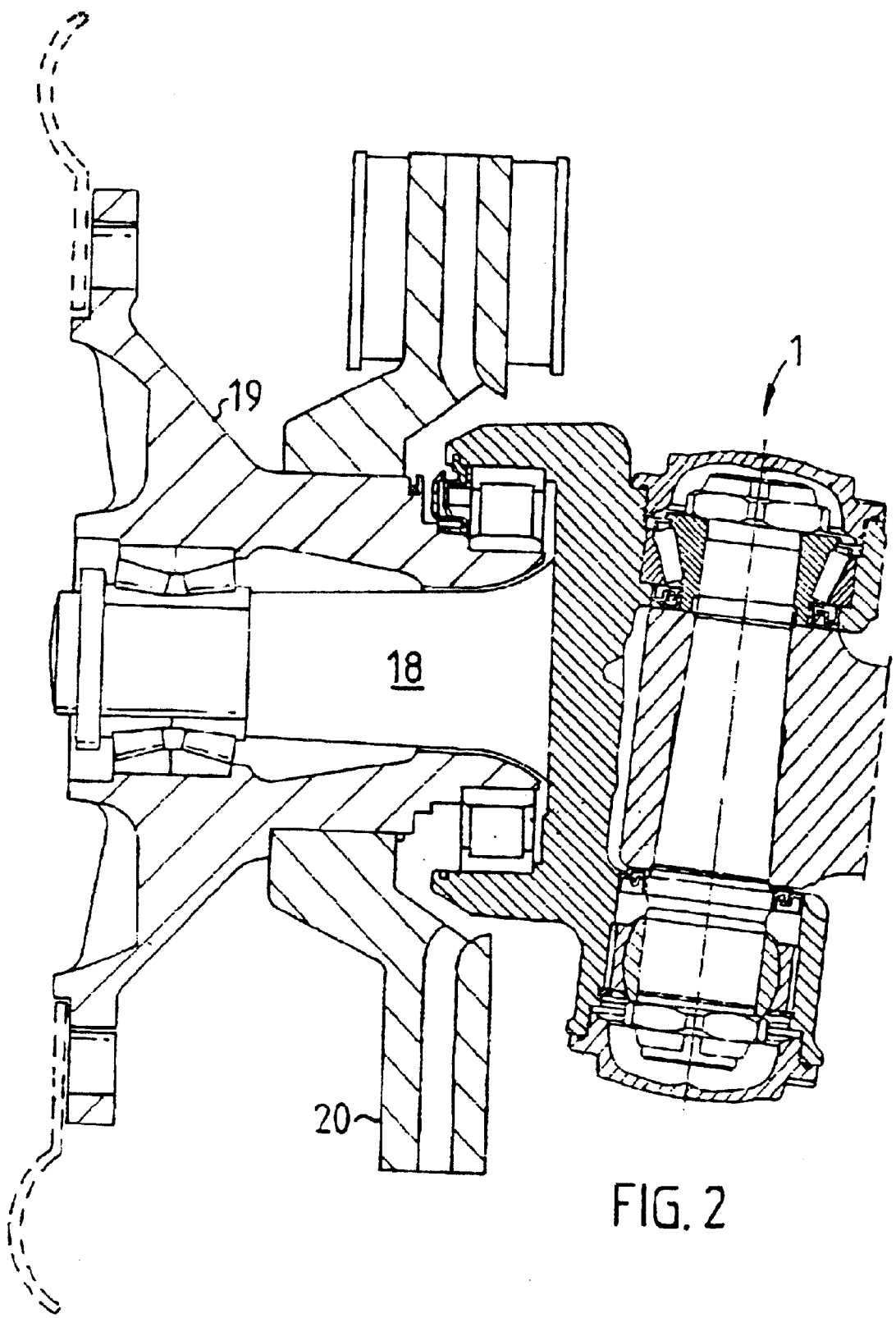
FIG. 2 shows in a partial cross-sectional view the spindle arrangement of FIG. 1 with a wheel arranged on the spindle unit.
Figure 3:
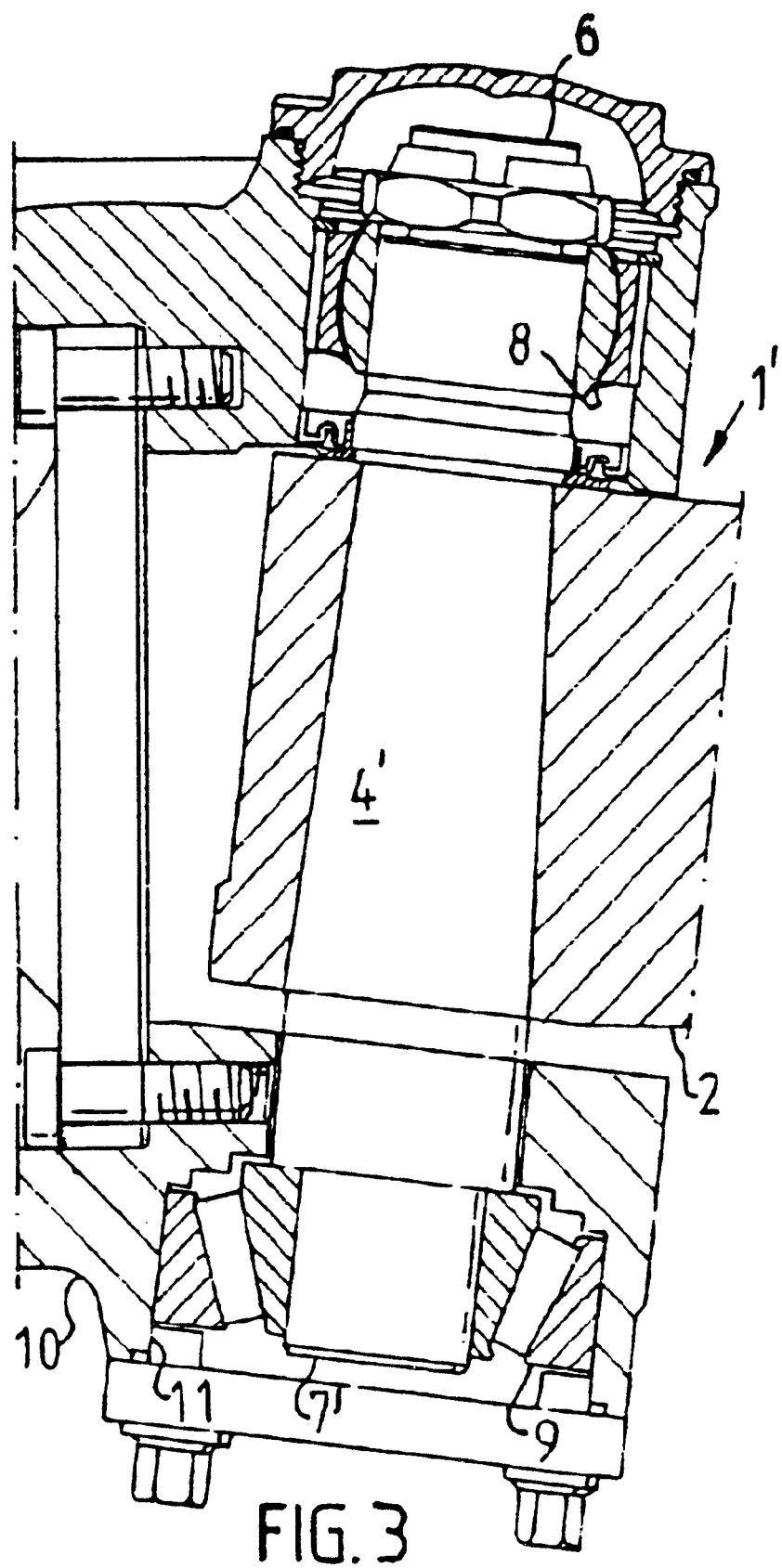
FIG. 3 shows in a partial cross-sectional view a second exemplary embodiment of a spindle arrangement according to the present invention.

FIG. 2 shows the spindle arrangement 1 according to the first exemplary embodiment, where a stub axle unit 18, on which a wheel hub 19 is mounted, is connected to the spindle unit 10. A brake disc 20 is also arranged on the wheel hub FIG. 3 shows a spindle arrangement 1' according to a second exemplary embodiment of the present invention. According to this second exemplary embodiment, the first end 6' of the kingpin 4' constitutes an upper end of the kingpin 4' in relation to the vehicle. The spherical sliding bearing 8 is arranged at the first end 6', and a conical roller bearing 9 is arranged at the second end 7'. Again in this case, the spherical sliding bearing 8 results in the kingpin 4' being allowed to be inclined in relation to the bore 11 of the spindle unit 10 without point loads and edge pressings occurring in the sliding bearing 8.

What is claimed is:

1. A spindle arrangement for a non-driven, steerable vehicle wheel for motor vehicles, said spindle arrangement comprising:

a spindle unit (10) which is rotatably mounted relative to a kingpin (4,4') accommodated in a front axle-beam (2), a stub axle unit (18) which is connected to said spindle unit (10) and on which a wheel hub (19) is mounted, and, arranged at a first end (6, 6') and a second end (7, 7') of said kingpin (4, 4'), bearing means (8, 9) for rotatable mounting of said spindle unit (10), said bearing means (8) at said first end (6, 6') of said kingpin (4, 4') is a spherical sliding bearing (8); and said spindle unit (10) is provided with bores (11), located at an axial distance from one another and aligned axially with one another, in which bores (11) said kingpin (4, 4') is mounted in said bores by said bearing means (8, 9);

said kingpin (4, 4') is provided with a conical central portion (5) which interact with a conical through-bore (3) in said front axle-beam (2); and said kingpin (4, 4') is oriented in relation to said spindle unit (10) so that said spherical sliding bearing (8) takes up only radial forces in relation to the center axis (12) of said kingpin (4, 4').

2. The spindle arrangement according to claim 1, wherein said first end (6) of said kingpin (4) constitutes a lower end of said kingpin (4) in relation to the motor vehicle.

3. The spindle arrangement according to claim 1, wherein said first end (6') of said kingpin (4') constitutes an upper end of said kingpin (4') in relation to the motor vehicle.

4. The spindle arrangement according to claim 1, wherein said bearing means (9) at said second end (7, 7') of said kingpin (4, 4') is a conical roller bearing (9) which is configured to take up axial forces in relation to said center axis (12) of said kingpin (4, 4').

5. The spindle arrangement according to claim 4, wherein said first end (6) of said kingpin (4) constitutes a lower end of said kingpin (4) in relation to the motor vehicle.

6. The spindle arrangement according to claim 4, wherein said first end (6') of said kingpin (4') constitutes an upper end of said kingpin (4') in relation to the motor vehicle.

7. A spindle arrangement for a non-driven, steerable wheel of a motor vehicles, said arrangement comprising:

a spindle unit including a kingpin rotatably mounted in a receiving through-bore, said kingpin having first and second ends, each of which is associated with one of two bearing assemblies that facilitate rotatable motion of the kingpin in the through-bore;

said through-bore being predominantly frusto-conically interiorly shaped and said kingpin being predominantly frusto-conically exteriorly shaped and configured for complimentary reception in said through-bore;

a pair of bores, one each at substantially opposite ends of said through-bore with one of said bearing assemblies positioned within each of said bores; and a first of said bearing assemblies being a spherical sliding bearing configured to exclusively take up radial forces relative to a center axis of said kingpin.

8. The spindle arrangement according to claim 7, further comprising:

a second of said two bearing assemblies being a conical roller bearing configured to take up axial forces acting along the center axis of the kingpin.

9. The spindle arrangement according to claim 7, wherein said spherical sliding bearing is positioned proximate an upper end of said kingpin.

10. The spindle arrangement according to claim 7, wherein said spherical sliding bearing is positioned proximate a lower end of said kingpin.

11. The spindle arrangement according to claim 7, wherein said conical roller bearing is positioned proximate an upper end of said kingpin thereby suspending said kingpin in said through-bore.

12. The spindle arrangement according to claim 7, wherein said conical roller bearing is positioned proximate a lower end of said kingpin thereby supporting said kingpin in said through-bore.

* * * * *